United States Patent [19]

Sherman

[11] Patent Number: 5,295,413
[45] Date of Patent: Mar. 22, 1994

[54] ONE-PIECE POWER TRANSMISSION CASING AND A METHOD OF ASSEMBLING A TRANSMISSION MECHANISM THEREIN

[75] Inventor: James F. Sherman, Brighton, Mich.

[73] Assignee: General Motors Corporation, Detroit, Mich.

[21] Appl. No.: 960,638

[22] Filed: Oct. 14, 1992

[51] Int. Cl.$^5$ .............................................. F16H 1/12
[52] U.S. Cl. ................................. 74/606 R; 74/421 A
[58] Field of Search .......................... 74/606 R, 421 A

[56] References Cited

U.S. PATENT DOCUMENTS

| | | | |
|---|---|---|---|
| 735,370 | 8/1903 | Hassler | 180/62 |
| 2,320,379 | 6/1943 | Niekamp | 74/421 A |
| 2,596,794 | 5/1952 | Schmitter | 74/421 A |
| 2,708,851 | 5/1955 | Moerk | 74/421 A |
| 2,771,786 | 11/1956 | Gilbert et al. | 74/606 R |
| 3,117,648 | 1/1964 | Landreth | 180/55 |
| 3,434,366 | 3/1969 | Raso et al. | 74/421 A |
| 3,534,825 | 10/1970 | Reffle | 180/42 |
| 4,147,071 | 3/1979 | Scribner et al. | 74/421 A |
| 4,787,267 | 11/1988 | Kessler et al. | 74/606 R |
| 5,085,456 | 10/1991 | Manrique et al. | 74/606 R |
| 5,095,767 | 3/1992 | Spridco et al. | 74/421 A X |
| 5,142,940 | 9/1992 | Hasegawa | 74/606 R |
| 5,156,069 | 10/1992 | Bitsch et al. | 74/606 R |

FOREIGN PATENT DOCUMENTS 118963  6/1947  Sweden ............................ 63/1/01

*Primary Examiner*—Leslie A. Braun
*Assistant Examiner*—Ryan W. Massey
*Attorney, Agent, or Firm*—Donald F. Scherer

[57] ABSTRACT

A transmission casing embodying the concepts of the present invention has a one-piece body portion with front and rear faces. The first of two major openings penetrates the front face, and the second of the two major openings penetrates the rear face. A pair of axially spaced front and rear drive gear bearing supports are provided in the transmission casing, and the drive gear bearing supports are axially accessible through the first major opening. A pair of axially spaced front and rear idler gear bearing supports are laterally displaced from the respective drive gear bearing supports and the idler gear bearing supports are also axially accessible through the first opening. A final drive bearing retainer is demountably secured within the second major opening. A final drive rear bearing support is carried by the final drive bearing retainer. An aperture for receiving the final drive front bearing support penetrates the first face and is aligned with the final drive rear bearing support.

7 Claims, 3 Drawing Sheets

ONE-PIECE POWER TRANSMISSION CASING AND A METHOD OF ASSEMBLING A TRANSMISSION MECHANISM THEREIN

TECHNICAL FIELD

The present invention relates to vehicular transmissions. More particularly, the present invention relates to vehicular power transmissions housed in a one-piece casing. Specifically, the present invention relates to a unique configuration for a one-piece, vehicular transmission casing as well as to a unique method by which to assemble a power transmission mechanism within the one-piece casing.

BACKGROUND OF THE INVENTION

It is common practice to provide either a split or a multiple piece casing within which to house the transmission mechanism. This approach has heretofore been employed in order to provide access to the interior of the casing. Such access is deemed necessary to insert and assemble not only the components of the transmission but also the bearings to support the rotatable members of the transmission mechanism. When one employs either split or multiple piece casings, gaskets and a plurality of fasteners are required to secure the casing in its assembled condition.

When one or more gaskets are employed to seal the casing, several factors must be taken into consideration. Most importantly, the casing must have sufficient rigidity to assure that the surfaces that engage the sealing gaskets will maintain their structural integrity in order to maintain the requisite seal. This generally requires the use of additional material to make the casing, and even then, special considerations may need to be given to the particular structural configuration necessary to impart the desired rigidity to the casing.

Each accommodation required to assure that either a split or a multiple piece casing will provide the desired results increases the costs of providing such a transmission. As such, the benefits to be achieved by the adoption and use of a one-piece casing are apparent but have remained elusive inasmuch as the designs heretofore available do not obviate all the deficiencies experienced with the historic split or multiple piece casings.

SUMMARY OF THE INVENTION

It is therefore a primary object of the present invention to provide an improved, one-piece transmission casing.

It is another object of the present invention to provide a transmission casing, as above, that may be readily fabricated by casting and with minimal machining.

It is a further object of the present invention to provide a transmission casing, as above, that need only be machined to provide bearing support surfaces.

It is still another object of the present invention to provide a transmission casing, as above, wherein the majority of the machining can be accomplished by parallel boring from one side of the housing with only the seat for a final bearing retainer requiring machining from the other side of the casing.

It is yet another object of the present invention to provide a transmission casing, as above, that minimizes the number of leak paths.

It is a still further object of the present invention to provide a transmission casing, as above, wherein the leak paths may be closed with diametral compression seals and without the need for gaskets.

These and other objects of the invention, as well as the advantages thereof over existing and prior art forms, which will be apparent in view of the following detailed specification, are accomplished by means hereinafter described and claimed.

In general, a transmission casing embodying the concepts of the present invention has a one-piece body portion with front and rear faces. The first of two major openings penetrates the front face, and the second of the two major openings penetrates the rear face. A pair of axially spaced drive gear bearing supports are provided in the transmission casing, and the drive gear bearing supports are axially accessible through the first major opening. A pair of axially spaced idler gear bearing supports are laterally displaced from the drive gear bearing supports and the idler gear bearing supports are also axially accessible through the first opening.

A final drive bearing retainer is received within the second major opening. A first final drive bearing support is provided in the final drive bearing retainer. An aperture for receiving a second final drive bearing support penetrates the first face and is aligned with the first final drive bearing support.

The present invention is described in conjunction with one exemplary embodiment of a one-piece transmission housing which is deemed sufficient to effect a full disclosure of the subject invention. The exemplary one-piece transmission casing is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
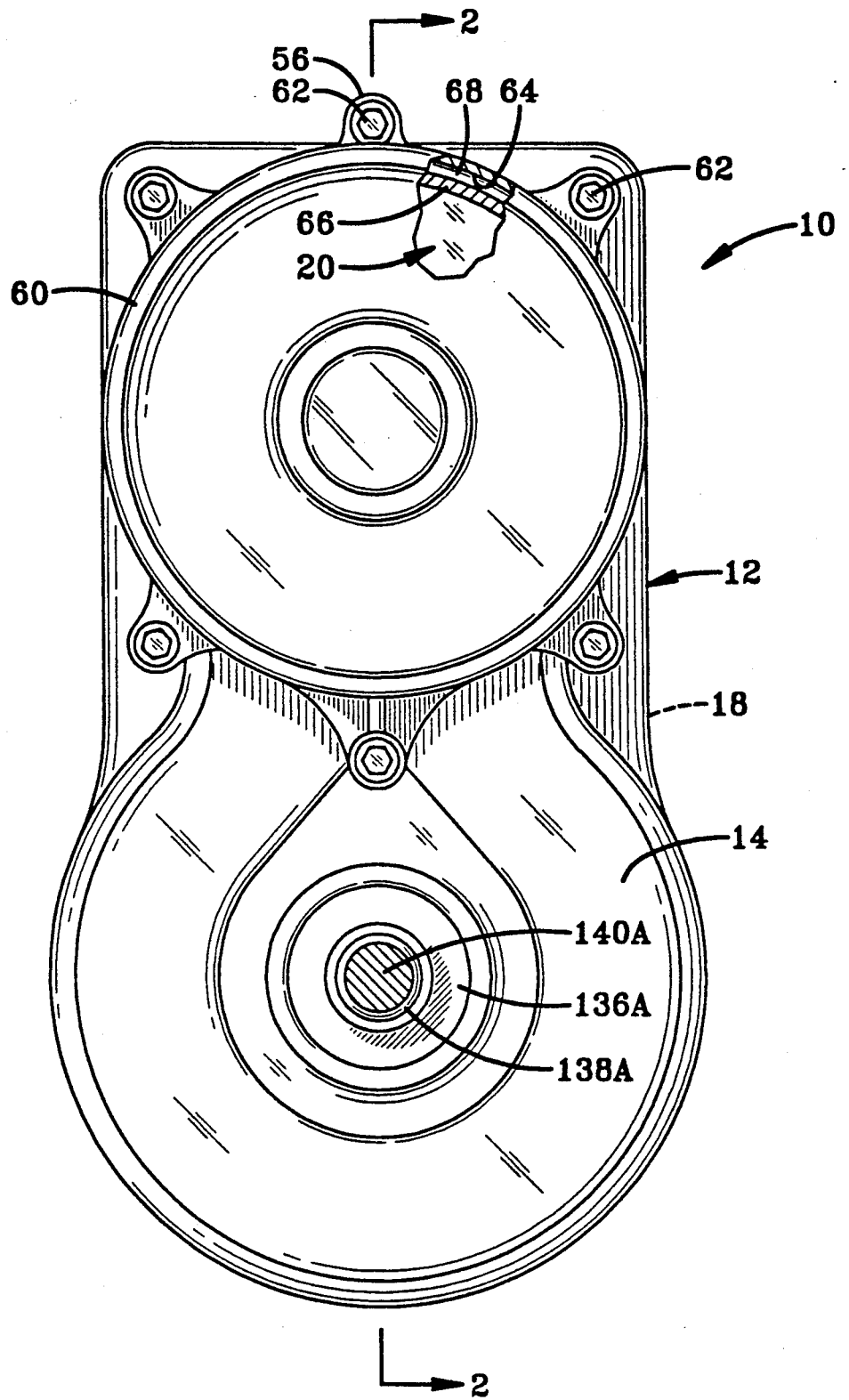
FIG. 1 is an elevational view, partly broken away, depicting one face of a one-piece transmission casing embodying the concepts of the present invention.
Figure 3:
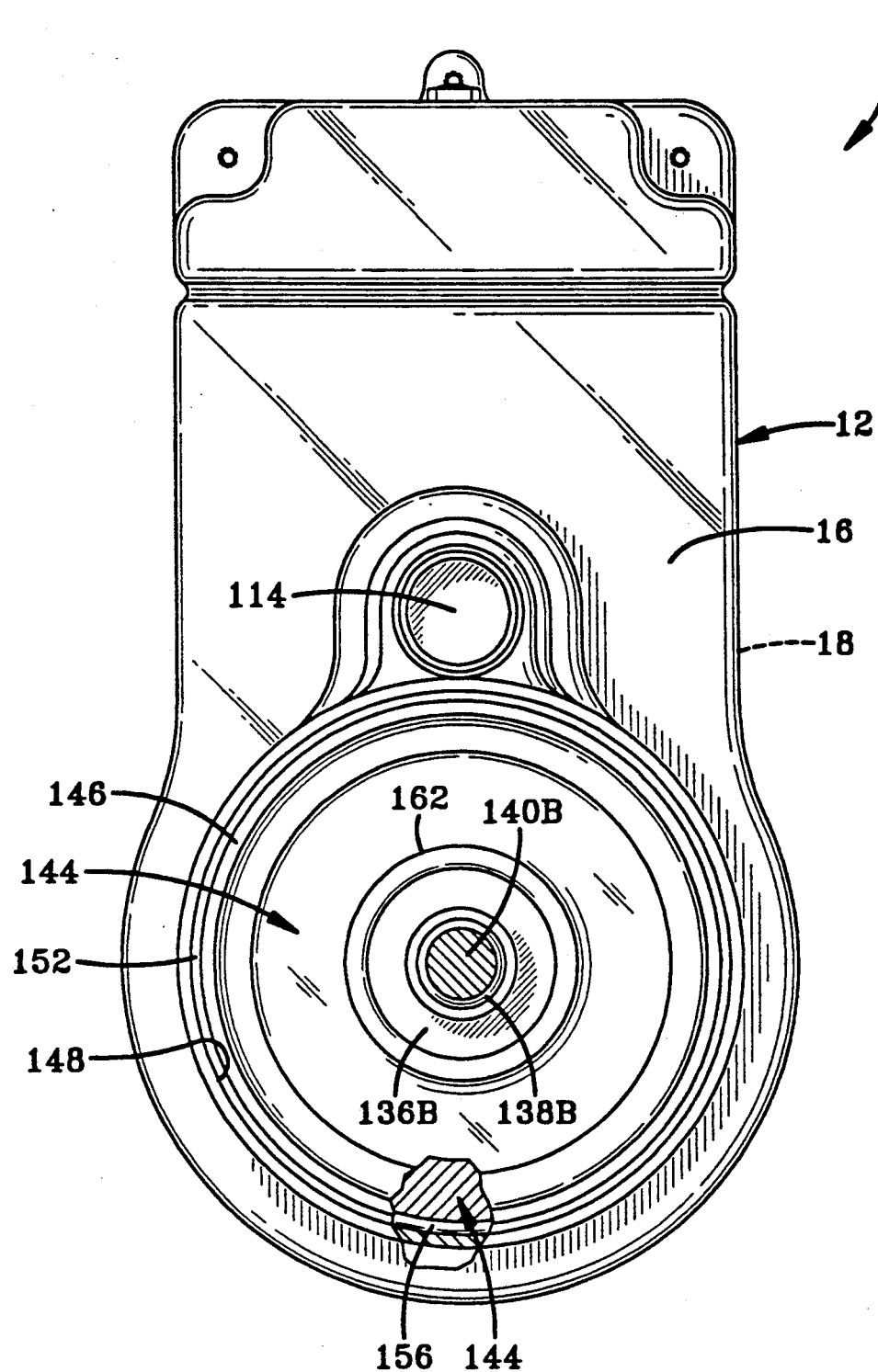
FIG. 3 is an elevational view, also partly broken away, depicting the opposite face of the one-piece transmission casing depicted in FIGS. 1 and 2.

A representative embodiment of a transmission casing, and one which accomplishes the object of the present invention, is designated generally by the numeral 10 on the accompanying drawings. With particular reference to the drawings, the transmission casing 10 includes a one-piece, body portion 12 having a front face 14 (FIG. 1) and a rear face 16 (FIG. 3) that are conjoined by an axially extending, peripheral boundary wall 18. Two major openings are provided in the body portion 12. The first major opening 20 penetrates the front face 14, and the second major opening 22 penetrates the rear face 16.

A pair of axially spaced annular drive gear bearing support surfaces 24A and 24B (FIG. 2) are provided in the transmission casing 10 and are axially accessible through the first major opening 20 (which penetrates the front face 14), and a drive gear assembly 26 is rotatably mounted on the bearing support surfaces 24. Based upon their respective proximity to the front and rear faces 14 and 16, the drive gear bearing surface 24A will be designated as the front drive gear bearing surface 24A, and the drive gear bearing surface 24B will be designated as the rear drive gear bearing surface 24B.

As previewed in the preceding paragraph, and as will appear in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified, it shall be referenced by virtue of a letter suffix employed in combination with the numerical designation employed for general identification of that structural member, component or arrangement. For example, there are at least two drive gear bearing support surfaces which are generally identified by the numeral 24, but the specific individual drive gear bearing support surfaces are, therefore, identified as 24A and 24B in the specification and on the drawings. The same suffix convention shall be employed throughout the specification.

As depicted, a pair of front and rear bearing sets 28A and 28B are mounted on the respective front and rear bearing support surfaces 24A and 24B. The rear bearing support surface 24B may be provided with a radially extending positioning shoulder 30 that is adapted to engage the outer race ring 32B of the rear bearing set 28B to delineate the axial extent to which the bearing set 28B can approach the rear face 16 of the transmission casing 10. A more complete description of the functions of the shoulder 30 will be hereinafter provided.

The drive gear assembly 26 may, as shown, comprise a transmission drive gear 34 that is integrally formed on the transmission input shaft 36. Alternatively, the transmission drive gear and the input shaft may be two separate, but interconnected, components. In either event, the drive gear 34 is rotatably mounted from the support surfaces 24. As previously described herein, the radial positioning shoulder 30 engages the outer race ring 32B of the rear drive shaft bearing set 28B, and the inner race ring 38B of drive shaft bearing set 28B engages the adjacent, rear end face 40 of the transmission drive gear 34.

The inner race ring 38A of the front bearing set 28A engages the front end face 42 of the transmission drive gear 34, and the outer race ring 32A of drive shaft bearing set 28A is engaged by a snap ring 44 that is removably receivable within a recess 46 provided in the front, annular, bearing support surface 24A. The snap ring 44 thus assures that the rear bearing set 28B will remain in engagement with the radially oriented positioning shoulder 30, and with all the components located between the snap ring 44 and the positioning shoulder 30 thereby also being secured in their intended positions.

As shown, the outboard (relative to the casing 10) end portion 48 of the transmission input shaft 36—which is readily accessible through the front face 14 of the casing 10—may be detachably conjoined to the output shaft 50 of a motor 52, as by a spline connection 54. The mounting flanges 56, which extend radially outwardly from the end wall 58 of the motor housing 60, combine to close that major opening 20 provided in the front face 14 of the transmission casing 10 when the motor housing 60 is demountably secured to the one-piece body portion 12 of the transmission casing 10, as by the plurality of cap screws 62 depicted.

With the motor housing 60 secured to the front face 14 of the casing 10, the output shaft 50 of the motor 52 will be drivingly connected to the transmission input shaft 36 which supports and which is rotatable with the transmission drive gear 34.

Figure 2:
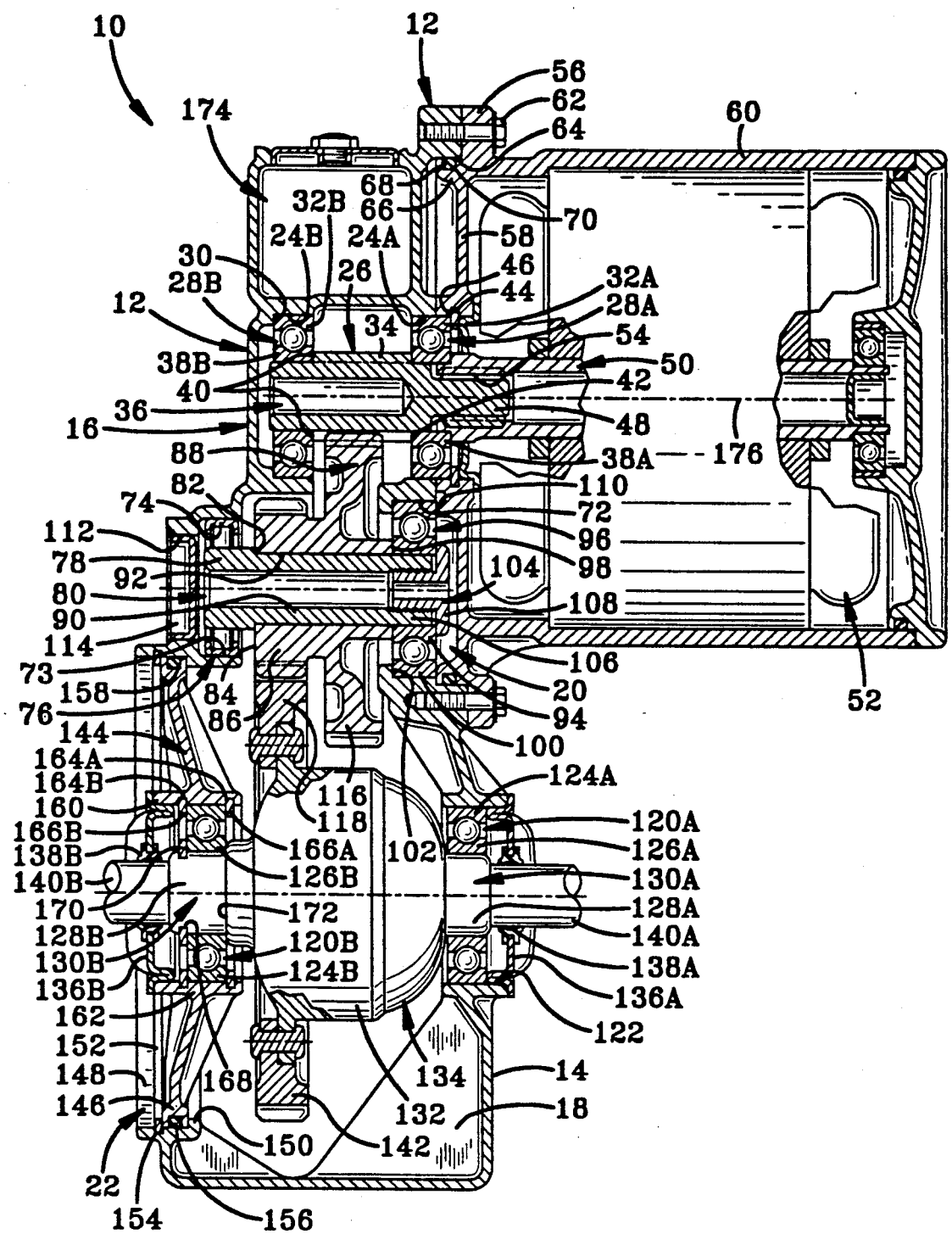
FIG. 2 is a vertical section taken substantially along line 2—2 of FIG. 1 to depict a representative transmission mechanism housed within the transmission casing.

As is best seen in FIG. 2, an annular centering surface 64 is provided in the one-piece body portion 12 of the transmission housing 10 to receive and center the bull-nose projection 66 which extends axially outwardly from the end wall 58 of the motor housing 60. The centering surface generally circumscribes the major opening 20 that penetrates the front face 14 of the transmission housing 10 and interacts with a diametral compression sealing means which may be in the form of an O-ring 68 that is received within an annular recess 70 incised into the annular periphery of the bull-nose projection 66. When the components are disposed, as depicted in FIG. 2, the cap screws 62 maintain the O-ring 68 compressed between the centering surface 64 and the projection 66 to seal the major opening 20 from the exterior environment without a gasket.

A pair of axially spaced front and rear idler gear bearing support surfaces 72 and 73 are laterally displaced from the respective drive gear bearing support surfaces 24A and 24B, and the idler gear bearing support surfaces 72 and 73 are similarly accessible through the first major opening 20. The outer race ring 74 of the rear idler shaft bearing 76 is seated on the rear bearing support 73 in order rotatably to receive the expanded end portion 78 of an idler shaft 80.

When the expanded end portion 78 of the idler shaft 80 is received in the rear idler shaft bearing 76, a radially oriented, annular shoulder 82 provides a locating stop against which the rear face 84 on the hub portion 86 of an idler cluster gear 88 may be juxtaposed. The reduced diameter portion 90 of the idler shaft 80 is received within a mounting bore 92 that extends axially through the hub portion 86 of the idler gear 88 to be received within the inner race ring 94 of the idler shaft front bearing 96.

The front face 98 on the hub portion 86 of the idler gear 88 is engaged by the inner race ring 94 of the idler shaft front bearing 96. The outer race ring 100 of the idler shaft front bearing 96 is received on the front idler bearing support surface 72 and is axially located against a radially oriented positioning shoulder 102 extending radially inwardly from the front, bearing support surface 72.

A retaining cap 104 is threadably received with the hollow inboard end portion 106 of the idler shaft 80. When the retaining cap 104 is tightened into the hollow end portion 106 of the idler shaft 80, the rim 108 of the retaining cap 104 will be forced against the inner race ring 94 of the idler shaft front bearing 96 to capture not only the idler shaft front bearing 96 but also the idler gear 88 between the rim 108 and the shoulder 82 on the idler shaft 80.

A positioning lug 110 extends axially from the exterior of the end wall 58 on the motor housing 60, and when the motor housing 60 is secured to the transmission casing 10, the positioning lug 110 will force the outer race ring 100 of the idler shaft front bearing 96 against the radially oriented shoulder 102 that is associated with the idler gear front support surface 72. To assure the application of a uniform clamping force against the outer race ring 100 of the idler shaft front bearing 96, the positioning lug 110 may be annular.

An access bore 112 penetrates the rear face 16 in alignment with the operating location of the idler shaft 80 to permit assembly of the idler shaft 80 within the body portion 12 of the transmission casing 10, as will be hereinafter more fully explained. The access bore 112 may be closed by a snap cap 114.

The idler cluster gear 88 has tandem gears 116 and 118. The gear 116 meshingly engages the drive gear 34 when the transmission is assembled within the casing 10. The function of the gear 118 will be more fully hereinafter explained.

The final drive front bearing set, identified by the alphanumeric designation 120A, is received within an annular aperture 122 that penetrates the front face 14 of the transmission casing 10. Specifically, the outer race ring 124A of the final drive bearing set 120A may be press fit within the annular aperture 122, and the inner race ring 126A supportingly engages the cylindrical exterior surface 128A of a journal 130A that extends outwardly from the sub-housing 132 of the final drive assembly 134.

A bearing seal support 136A may be press fit into the aperture 122. The bearing seal support 136A carries the seal 138A which engages the axle 140A that is rotatably received within, and extends axially outwardly from, the journal 130A. The final drive assembly 134 may, as shown, be in the nature of a differential. As such, conventional side gears (not shown) located within the final drive assembly drive the axles 140 which extend rotatably through the journals 130. The connection of the side gears to the respective axles, as well as the rotation of the axles 140 within the journals 130, are accomplished by means well known to those skilled in the art. In any event, it must be appreciated that the sub-housing 132 rotates independently of the axles 140. In addition, a ring gear 142 is secured to the sub-housing 132 (which serves as the conventional cage) of final drive assembly 134 to engage the gear 118 on the idler gear 88.

A final drive bearing retainer 144 is removably received within the second major opening 22—i.e.: the opening in the rear face 16 on the body portion 12 of the transmission casing 10. Specifically, the bearing retainer 144 has an annular outer rim 146 that is received on the cylindrical surface 148 that circumscribes the major opening 22 in the rear face 16 of the transmission casing 10. A stop rib 150 extends radially inwardly from the cylindrical surface 148, and the rim 146 of the bearing retainer 144 engages the stop rib 150.

A snap ring 152 may be received within a recess 154 that extends annularly about the cylindrical surface 148 to engage the rim 146 and secure it against the stop rib 150. A diametral compression seal, such as the O-ring 156 may be received within a recess 158 that extends circumferentially of the rim 146 such that the seal 156 will be compressed radially against the cylindrical surface 148 that bounds the second major opening 22. When the bearing retainer 144 is mounted on the body portion 12 of the transmission casing 10, the diametral compression seal 156 is compressed between the rim 146 and the cylindrical surface 148 to seal the major opening 22 from the exterior environment without a gasket.

The rear final drive bearing set 120B is carried by the final drive bearing retainer 144 such that when the final drive bearing retainer 144 is properly positioned within the opening 22, the final drive bearing sets 120A and 120B will be aligned. To that end, the final drive front bearing set 120B is received within an annular aperture 160 that penetrates the hub 162 of the bearing retainer 144. Specifically, the outer race ring 124B of the final drive rear bearing set 120B may be press fit within the annular aperture 160, and the inner race ring 126B supportingly engages the cylindrical exterior surface 128B of the journal 130B that extends outwardly from the subhousing 132 of the final drive assembly 134. A bearing seal support 136B may also be press fit into the aperture 160. The bearing seal support 136B carries the seal 138B which engages the axle 140B that is rotatably received within, and extends axially outwardly from, the journal 130B.

The final drive assembly 134 is thus supported from the opposing journals 130A and 130B that extend outwardly therefrom to be rotatably supported in the respective front and rear final drive bearing sets 120A and 120B. As depicted, the hub 162 of the final drive bearing retainer 144 may be provided with axially spaced circumferential recesses 164A and 164B that are incised therein to receive retaining rings 166A and 166B. The axial spacing of the recesses 164 is such that the rings 166 received therein will embrace the outer race ring 124A of the final drive rear bearing 120B.

The cylindrical outer surface 128B of the journal 130B that extends outwardly through the inner race ring 126B of the final drive rear bearing set 120B is provided with a peripheral recess 168 that receives a snap ring 170 to assure that the final drive assembly 134 will not move forwardly within the casing 10. The shoulder 172 presented at the juncture of journal 130B with the subhousing 132 engage the inner race ring 126B to rotate therewith and to assure that the final drive assembly 134 will not move rearwardly within the casing 10.

The unique configuration of the body portion 12 lends itself to being fabricated by conventional lost foam casting means. Provision for the four passages which penetrate the body portion 12—i.e.: the first and second major openings 20 and 22, the access bore 112 and the aperture 122 through the front face 14—can be accommodated by the lost foam casting process itself, or the openings may be provided by a subsequent boring operation. In either event, the openings will require minimal machining inasmuch as the housing 10 will be sealed by virtue of the diametral compression sealing means 68 and 156.

Although it is not critical to the present invention, the body portion 12 of the casing 10 may incorporate a reservoir 174 to store lubricating fluid, not shown.

A method for assembling the components of a transmission within the body portion 12 of a one-piece casing 10 comprises a sequence of relatively unique steps which will now be described with particular reference to FIG. 2. After the body portion 12 of the casing 10 has been cast, the finished machining is readily accomplished. For example, the first major opening 20 is provided with a centering surface 64, the drive gear bearing support surfaces 24, the respective front and rear idler gear bearing support surfaces 72 and 73 as well as the access bore 112 may be finished by relatively uncomplicated machining procedures. For example, the novel configuration of the present transmission housing 10 permits those surfaces to be machined by a parallel line boring machine that can access all those surfaces through the first major opening 20. The cylindrical surface 148 and the aperture 122 may also be finished by virtue of a parallel line boring machine operating through the second major opening 22, which penetrates the rear face 16.

With the machining completed, assembly may be begun by inserting either the drive gear assembly 26 or the idler gear 88 into its operating position. Although those members may be assembled in either order, assembly will be explained as though the drive gear assembly 26 is installed first. Once one comprehends the concept, the exact order of assembly can be clearly varied within the scope of the present invention.

Accordingly, the drive gear assembly 26 is inserted through the first major opening 20 so that the bearing sets 28 will be seated on the appropriate supporting surfaces 24. Insertion of the snap ring 44 into the recess 46 will not only secure the drive gear assembly 26 in place but will also signal that the assembly 26, and its bearing sets 28, have been accurately installed within the casing 10.

The rear idler shaft bearing 76 is also inserted through the first major opening 20 to be seated on the rear support surface 73. The idler gear 88 is then inserted through the second major opening 22 and manipulated into operative engagement with the transmission drive gear 34—i.e.: the gear 116 on the idler gear 88 are brought into meshing engagement with the transmission drive gear 34. With the idler gear 88 meshingly engaging the drive gear 34, the idler shaft 80 is inserted into the casing 10 through the access bore 112 in the rear face 16 operatively to engage the idler shaft rear bearing 76, to extend through the mounting bore 92 in the hub portion 86 of the idler gear 88 and operatively to engage the idler shaft front bearing set 96, which may have been previously seated on the idler gear front bearing support 72 through the first major opening 20.

When the idler shaft 80 is received through the idler shaft front bearing set 96, the retaining cap 104 is screwed into the hollow end portion 106 of the idler shaft 80 and tightened until the idler gear 88 and the idler shaft front bearing set 96 are firmly captured between the positioning shoulder 82 on the idler shaft 80 and the rim 108 of the retaining cap 104. So positioned, the first ring of teeth 116 on the idler gear 88 is meshingly engaged with the transmission drive gear 34 so that the idler gear 88 will rotate in response to rotation of the drive gear 34.

The diametral compression seal 68 is positioned in the annular recess 70 in the bull-nose projection 66, and the projection is engagingly received within the centering surface 64 that circumscribes the first major opening 20 in the body portion 12 of the transmission casing 10. With the motor housing 60 thus aligned with respect to the first major opening 20, the motor output shaft 50 operatively engages the transmission input shaft 36 by virtue of the spline connection 54. The cap screws 62 are then tightened to secure the motor housing 60 to the transmission casing 10.

As the motor housing 60 is thus mounted, the diametral compression seal 68 is interposed between the bull-nose projection 66 on the motor housing 50 and the centering surface 64 that circumscribes the first major opening 20. By orienting the seal 68 eccentrically with respect to the centerline 176 of the motor output shaft 50, as shown, the seal effectively closes the entire opening 20 without the need for a gasket. As the motor housing 60 is secured to the casing 10, the positioning lug 100 drives the outer race ring 100 of the idler shaft front bearing set 96 against the shoulder 102 to secure the idler gear 88 against axial displacement.

With the final drive bearing set 120A seated in the aperture 122 through the front face 14 of the transmission casing 10, the final drive assembly 134 is inserted into the casing 10 through the second major opening 22. The final drive assembly 134 is manipulated such that the journal 130A extends through the inner race ring 126A of the final drive bearing set 120A and the ring gear 142 meshingly engages the second ring of teeth 118 on the idler gear 88.

In preparation for installation of the final drive bearing retainer 144, the second diametral compression seal 156 has been previously positioned in the recess 158. The final drive bearing set 120B has similarly been previously seated in the annular aperture 160 through the hub 162 of the bearing retainer 144. With the bearing retainer 144 thus prepared, the journal 130B on the final drive assembly 134 is guided through the inner race ring 126B of the final drive bearing set 120B while the annular outer rim 146 of the bearing retainer 144 is simultaneously seated on the cylindrical surface 148 of the second major opening 22.

The snap ring 152 secures the rim 146 against the stop rib 150 and forces the inner race ring 126B of the final drive bearing set 120B into a position, such that the snap ring 170 may be inserted in the recess 168 to secure the final drive assembly 134 in the desired position. The diametral compression seal 156 being interposed between the final drive bearing retainer 144 and the surface 148 that bounds the second major opening 22 seals the second major opening 22 without the need for a gasket.

While certain specific details of a particular embodiment have been shown for the purpose of illustrating the invention, it should be apparent to those skilled in the art that various changes and modifications may be made therein without departing from the spirit or scope of the invention. It is, therefore, to be understood that within the scope of the appended claims the invention may be practiced otherwise than as specifically described.

As should now be apparent, the present invention not only teaches that a transmission casing embodying the concepts of the present invention may be conveniently cast in one piece, to allow the facile assembly of the transmission therein but also that the transmission casing also accomplishes the other objects of the invention.

The embodiments of the invention in which an exclusive property or privilege is claimed are defined as follows:

1. A method for assembling a transmission within a one-piece casing comprising the steps of:
   fabricating a hollow transmission casing having axially spaced front and rear faces cojoined by an axially extending peripheral boundary wall, a first major opening penetrating the front face, a second major opening penetrating the rear face, an idler shaft access aperture penetrating the rear face and an aperture penetrating the front face in substantial alignment with the second major opening;
   machining axially spaced front and rear drive gear bearing supports located in general proximity to the respective front and rear faces;
   machining axially spaced front and rear idler gear bearing supports that are also located in general proximity to the front and rear faces but in laterally displaced relation relative to the front and rear drive gear bearing supports;

machining a final drive front bearing support through said front face;

inserting a drive gear, a drive gear shaft and drive gear bearings through the first major opening to be supported by the front and rear drive gear bearing supports;

inserting front and rear idler bearings through the first major opening;

positioning the front and rear idler bearings on the respective front and rear idler gear bearing supports;

inserting an idler gear through the second major opening;

manipulating the idler gear into engagement with the drive gear;

inserting an idler gear support shaft through the idler gear shaft access opening operatively to engage the idler gear and the idler gear bearings to support the idler gear for rotation in response to rotation of the drive gear.

2. A method, as set forth in claim 1, wherein the machining of the front and rear drive gear bearing supports, the front and rear idler gear bearing supports and the final drive front bearing support is accomplished by the steps of:

parallel boring the casing from only one side thereof.

3. A method, as set forth in claim 1, comprising the further steps of:

securing a motor and motor housing to the first major opening such that the motor operatively engages the drive gear and motor housing closes the first major opening;

mounting a final drive assembly through the second major opening to engage the idler gear; and closing the second major opening with a final drive bearing retainer.

4. A method for assembling a transmission, as set forth in claim 1, comprising the further step of:

inserting a diametral compression seal member between the motor housing and the first major opening.

5. A method for assembling a transmission, as set forth in claim 4, comprising the further step of:

inserting a diametral compression seal member between the final drive bearing retainer and the second major opening.

6. A method for assembling a transmission, as set forth in claim 1, comprising the further steps of:

mounting a drive shaft front bearing in the final drive bearing support in the front face; and mounting a drive shaft rear bearing in the final drive bearing retainer.

7. A method for assembling a transmission, as set forth in claim 1, comprising the further step of:

mounting the drive shaft bearings, front and rear on the final drive assembly.

* * * * *